Patented July 20, 1937

2,087,852

UNITED STATES PATENT OFFICE 2,087,852

SYNTHETIC RESINOUS OR RESINOID PRODUCTS AND PROCESS OF MAKING SAME

Carleton Ellis, Montclair, N. J., assignor to Ellis-Foster Company, a corporation of New Jersey No Drawing. Application June 27, 1927, Serial No. 201,964

44 Claims. (Cl. 260—8)

This invention relates to synthetic resins and to the process of making same, and particularly to such resins as may be made by treating a polyhydric alcohol with a monobasic or polybasic carboxylic acid.

In my prior application, Serial No. 609,136, filed November 26, 1922, there are disclosed and claimed resinous substances prepared from glycerol, polyglycerol, glycol and similar polyhydric alcohols, and monobasic or polybasic carboxylic acids or their anhydrides, such as phthalic acid and anhydride, citric, malic, tartaric, maleic, fumaric, oleic, stearic acids and also certain resin acids. That companion case illustrates these combinations by various resins, such as phthalic glyceride, tartaric glyceride, malic glyceride, phthalic polyglyceride, phthalic glycerol oleic acid combinations, phthalic glycerol stearic acid combinations, etc. That case is now Patent No. 1,897,977, granted February 14, 1933.

In companion copending application, Serial No. 193,726, the preparation of resins from various polyhydric alcohols and organic acids are also set forth, this application particularly covering the glycol ether reaction products, and particularly when glyceride oil components are present in the complex.

The object is to modify the solubility, decrease the tendency to harden or polymerize under heat treatment and to obtain various fusible resins notably resistant to water.

Using substituted acids it becomes a more simple matter to prepare a hard resin of fairly high melting point which is sufficiently soluble in such solvents, as, for example, ethyl alcohol, ethyl or butyl acetate, butyl propionate, and the like. For use as coating materials such as shellac substitutes, or for use in lacquers in combination with nitrocellulose, it is especially desirable to have as hard a resin as may be obtained and yet freely soluble in some particular solvent.

Phthalic glyceride resin, for example, is soluble in acetone, and the higher ketone solvents, but is not soluble in butyl acetate, propionate, toluol, xylol, butyl alcohol, and like solvents, and cannot therefore be dissolved in said solvents or blended with nitrocellulose solutions containing these in large proportion. The citric and also the tartaric glycerides of the fusible and soluble type are readily affected by water. Many of these unsubstituted resins are limited in value for various purposes owing to such characteristics.

In order to modify and change the solubility, fusibility and hardness, or color of these resins, I have found it advantageous to employ substituted mono or polybasic carboxylic acids in place of the normal polybasic carboxylic acids heretofore used. Such materials as nitro, chloro, bromo, iodo, acetyl, alkyl, amino, nitrite and aryl derivatives of the polybasic carboxylic acids are among those considered within the scope of this invention. By employing such acids various resins derived therefrom may be obtained, having considerably different degrees of solubility, fusibility and hardness. The employment of such acids readily constitutes a means for securing practically any desired solubility, hardness and color.

When three molecular equivalents of phthalic anhydride are slowly heated with two molecular equivalents of glycerol to a temperature of about 230° C., a clear, transparent, hard and fusible resin is obtained. By increasing the temperature to approximately 240-250° C., a sudden polymerization will occur and an insoluble and infusible product is obtained. If the heat treatment has stopped short of this polymerization, say, when the temperature has reached 230° C., a resin soluble in acetone is obtained.

In contrast with this particular resin the molecular equivalents of bromo phthalic acid and glycerol equal to approximately 15 parts by weight of glycerol and 50.4 parts by weight of bromo phthalic acid were heated slowly to a temperature of 280° C. A hard very light straw colored resin was obtained, which was fusible and yet insoluble in water, alcohol, acetone, toluol or butyl acetate. The use of the bromo phthalic acid in place of the phthalic acid or anhydride therefore has produced a more fusible resin which does not polymerize so easily and has decreased the solubility, so that the resin no longer is soluble in acetone. This resin is unique in that it is practically insoluble in all of the usual type of organic solvents, and yet is fusible, and may therefore be advantageously employed in molding compositions as a shellac substitute to form moldings resistant to such solvents.

Another resin was prepared from 4-nitro-phthalic acid 3 parts by weight and glycerol 1 part by weight. This mixture was heated to a temperature of 240° C., and finally taken as high as 280° C. without polymerizing. A yellowish, clear, hard resin, soluble in butyl acetate was obtained, miscible with nitrocellulose in a mixture of butyl acetate and butyl alcohol to form a lacquer.

Another resin prepared in the same manner from 3-nitro-phthalic acid was somewhat darker in color and not as soluble. This shows the influence of another substituted phthalic acid in place of ordinary phthalic acid and demonstrates the value of such material for producing an improved resin suitable for use in lacquers.

The substitution of nitro groups for the hydroxyl groups in citric and tartaric acids tends to eliminate the water solubility of resins derived therefrom.

Such acids as chlorophthalic acids or anhydride also are illustrations of substances adapted for the production of resins of modified characteristics.

A substituted polybasic carboxylic acid may be admixed with a substituted monobasic carboxylic acid, such as chloro or nitro benzoic acid, and the like, and the mixture reacted with glycerol or other polyhydric alcohols to form resins. The substituted polybasic carboxylic acids may also be admixed with unsubstituted polybasic carboxylic acids or monobasic acids and reacted with polyhydric alcohols to form resins. The mixed fatty acids of the vegetable oils may be used to further modify the resins derived from polyhydric alcohols and substituted polybasic carboxylic acids.

Such polyhydric alcohols as glycerol, polyglycerol, ethylene glycol, propylene glycol, and the several polyglycols, pentaerythritol and mannitol are contemplated for the purposes of this invention.

In some cases also I may employ the glycol ethers, e. g., dioxy diethyl ether, dioxy triethyl ether, dioxy tetra ethyl ether and similar dioxy mono or poly ethers. Etherized substituted resins and balsams thus are obtained.

A resin may be prepared from crude benzoic acid made by the nitric acid process and containing about 10 per cent of para nitrobenzoic acid. One procedure is:

| | Parts by weight |
|---|---|
| Crude benzoic acid as above | 98 |
| Phthalic anhydride | 118 |
| Glycerol (98 per cent) | 94 | are heated together with the temperature advancing slowly to 290° C. over a period of one and one-half hours. The reaction mixture is agitated throughout this time. The resinous product is readily soluble in various esters, ketones and mixed lacquer solvents. The acid number as made above was found to be 18.8.

A dark colored hard resin is made from

| | Parts by weight |
|---|---|
| Para nitrobenzoic acid | 25 |
| Phthalic anhydride | 22 |
| Glycerol (98 per cent) | 14 | by heating with agitation, raising temperature gradually to 280° C. during one and one-half hours. This resin is readily soluble in butyl acetate.

While I have indicated as a preferred form the heating all together of the reacting constituents I may vary this procedure by first reacting two of the components and then adding the third or additional constituents.

There may be included various natural resins such as rosin, or fossil resins, the latter being heat-treated or "run" to render soluble. "Run" Congo resin is suitable for the purpose and tends to give great hardness. Preferably these resins are reacted with the resinifying constituents to obtain special complexes.

Glycol ethers tend to yield soft products of the balsam type and when a higher melting point is desired, "run" Congo may be combined to form a Congo glycol-ether substituted organic acid complex.

The glycol ethers such as dioxy diethyl ether are solvents for nitrocellulose and are more advantageous to use than glycerol as the latter is not a solvent for nitrocellulose, hence any excess of glycerol may be detrimental in some cases.

Most of the substituted acids and anhydrides which I preferably employ as resinifying agents have from 3 to 10 carbon atoms in the molecule and generally are crystalline bodies. These include the derivatives of such acids as malic, maleic, fumaric, lactic, succinic, malonic, suberic, azelaic, salicylic, terephthalic, naphthoic, and the like.

With these resinifying acid derivatives or substituted acid agents-of-resinification, I may employ as indicated one or more non-crystalline acids, especially those having a large number of carbon atoms (say 12 or more) in the molecule. These include the fatty acids of corn, peanut, cottonseed, soya bean, fish, lard, tallow, tung, linseed, castor, and other glyceride oils, also rosin, kauri, manilla, copal, pontianac, Congo, and so forth.

My invention thus is concerned with compositions comprising a substituted-organic-acid glyceride complex, embracing the complex by itself, or mixtures of it with other substances, various solids, pigments and so forth, including solvents, nitrocellulose, cellulose acetate, and the like.

The invention further contemplates compositions comprising a substituted-organic-acid glycol-ether reaction product which may be in the form either of a resin or a balsam, such composition embracing the reaction product by itself or mixtures of it with other substances, various solids, pigments and so forth, including solvents, nitrocellulose, cellulose acetate, and the like.

I have particularly in mind as a specific embodiment, a liquid composition available for coating purposes and the like containing the resin or the balsam, or a mixture of the resin and the balsam in appropriate solvents, with or without nitrocellulose, pigments, nitrocellulose plasticizers, and the like.

What I claim is:—

1. A composition comprising a resinous reaction product of a mixture in which the sole reacting ingredients are substituted aromatic-organic-acid with glycerol in substantial amount, the substituted organic carboxylic acid having no ring structure other than that to which the carboxyl group is directly attached.

2. A composition comprising a substituted-non-hydroxy aliphatic organic-acid glycol-ether resin.

3. A process for making a synthetic resin, which consists in heating a mixture of a resinifying substituted aromatic polybasic carboxylic acid and a resinifying polyhydric alcohol until a resin is produced.

4. A process for making a synthetic resin, which consists in simultaneously heating a mixture of a resinifying substituted polybasic and a monobasic carboxylic acid and a resinifying polyhydric alcohol until a resin is produced.

5. A process for making a synthetic resin, which consists in heating a mixture of a resinifying non-hydroxy substituted polybasic acid and a monobasic carboxylic acid and a resinifying glycol-ether until a resin is produced.

6. A composition comprising a resinous reaction product of a mixture in which the sole reacting ingredients are substituted aromatic organic-acid with a polyhydric alcohol in substantial amount, the substituted organic carboxylic acid having no ring structure other than that to which the carboxyl group is directly attached.

7. A process for preparing synthetic complexes which comprises resinifying together a polyhydric alcohol and a non-hydroxy substituted aliphatic polybasic organic acid containing a substituent selected from the radicles consisting of nitro, chlor, brom, amino, nitrile, acetyl and aryl in proportions to yield a more fusible and less soluble resin than is obtained with the same proportions of the alcohol and the same acid unsubstituted the substituted organic acid being a substituted organic carboxylic acid having no ring structure other than that to which the carboxyl group is attached.

8. A composition including the reaction product of a non-hydroxy substituted polybasic aliphatic organic acid with a polyhydric alcohol as the sole reaction components.

9. A composition including a non-hydroxy substituted aliphatic polybasic organic acid reaction product with a polyhydric alcohol as the sole reaction components.

10. A composition including a substituted polybasic aromatic organic carboxylic acid-polyhydric alcohol reaction product.

11. A composition including a non-hydroxy substituted polybasic organic acid-polyhydric alcohol natural resin reaction product.

12. A composition including a substituted polybasic carboxylic organic acid-monobasic carboxylic acid-polyhydric alcohol natural resin reaction product.

13. A composition including a non-hydroxy substituted polybasic organic acid-polyhydric alcohol-mixed fatty acids of a natural glyceride reaction product.

14. A composition including a substituted polybasic carboxylic organic acid-monobasic carboxylic acid-polyhydric alcohol-glyceride fatty acid reaction product.

15. A composition including a substituted polybasic organic acid-glycol ether reaction product.

16. A composition including a substituted polybasic organic acid-alkylene glycol reaction product.

17. A composition including a non-hydroxy substituted polybasic organic acid-polyglycol reaction product.

18. As a new compound, the glycol ether ester of a non-hydroxy substituted aliphatic polycarboxylic acid.

19. As a new compound, the alkylene glycol ester of a substituted aromatic polycarboxylic acid.

20. As a new compound, an ester of a polyglycol with a substituted aromatic carboxylic acid the organic acid having no ring structure other than that to which the carboxyl group is attached.

21. As a new compound, a polyethylene glycol ester of a non-hydroxy substituted aliphatic polycarboxylic acid.

22. The process of preparing a resin of the polyhydric alcohol-polycarboxylic organic acid type which comprises heating a mixture containing a chloro-substituted phthalic acid and a polyhydric alcohol at a condensation temperature at least until a sample on cooling exhibits resinous properties.

23. A resinous product of the condensation of a chloro-substituted phthalic acid and a polyhydric alcohol.

24. The process of preparing a resin of the polyhydric alcohol-polycarboxylic organic acid type which comprises condensing a halogen-substituted aliphatic polycarboxylic acid with a polyhydric alcohol.

25. The process of preparing a resin of the polyhydric alcohol-polycarboxylic organic acid type which comprises condensing a halogen-substituted aliphatic dicarboxylic acid with glycerol.

26. The process of preparing a resin of the polyhydric alcohol-polycarboxylic acid type which comprises condensing a halogen-substituted aliphatic polycarboxylic acid with a polyhydric alcohol and an organic carboxylic acid.

27. A resinous condensation product derived from a halogen-substituted aliphatic polycarboxylic acid and a polyhydric alcohol.

28. A resinous condensation product derived from a chloro-substituted aliphatic polycarboxylic acid and a polyhydric alcohol.

29. A resinous condensation product derived from a halogen-substituted maleic acid and a polyhydric alcohol.

30. A resinous condensation product derived from a halogen-substituted aliphatic polycarboxylic acid, a polyhydric alcohol and an organic carboxylic acid.

31. A resinous condensation product derived from a halogen-substituted maleic acid, glycerol and an organic polycarboxylic acid.

32. A condensation product of the polyhydric alcohol-polycarboxylic organic acid type comprising a mixed organic acid ester of a polyhydric alcohol, at least one of the acid radicals of which is that of a halogen-substituted aliphatic polycarboxylic acid.

33. The process of preparing a resin of the polyhydric alcohol-polycarboxylic organic acid type which comprises condensing a halogen-substituted succinic acid with glycerol.

34. A resinous condensation product derived from a halogen-substituted succinic acid and a polyhydric alcohol.

35. The process of preparing a resin of the polyhydric alcohol-polycarboxylic organic acid type which comprises heating a mixture containing a halogen-substituted phthalic acid and a polyhydric alcohol at a condensation temperature at least until a sample on cooling exhibits resinous properties.

36. A composition of matter comprising a resinous product of the condensation of a halogen-substituted phthalic acid and a polyhydric alcohol.

37. The process of preparing a resin of the polyhydric alcohol-polycarboxylic organic acid type which comprises heating the mixture containing a halogen substituted aromatic polycarboxylic acid and a polyhydric alcohol at a condensation temperature at least until a sample on cooling exhibits resinous properties.

38. The process of preparing a resin of the polyhydric alcohol-polycarboxylic organic acid type which comprises condensing a polyhydric alcohol with a halogen substituted aromatic polycarboxylic acid and another organic carboxylic acid.

39. The process of preparing a resin of the polyhydric alcohol-polycarboxylic organic acid type which comprises condensing a polyhydric alcohol with a halogen-substituted phthalic acid and another organic carboxylic acid.

40. The process of preparing a resin of the polyhydric alcohol-polycarboxylic organic acid type which comprises condensing a polyhydric alcohol with a halogen-substituted phthalic acid and another organic polycarboxylic acid.

41. A composition of matter comprising a resinous product of the condensation of a halogen substituted aromatic polycarboxylic acid and a polyhydric alcohol.

42. A composition of matter comprising a product of the condensation of a polyhydric alcohol with a halogen substituted aromatic polycarboxylic acid and another organic carboxylic acid.

43. A composition of matter comprising a product of the condensation of a polyhydric alcohol with a halogen-substituted phthalic acid and another organic carboxylic acid.

44. A composition of matter comprising a product of the condensation of a polyhydric alcohol with chloro-substituted phthalic acid and another organic polycarboxylic acid.

CARLETON ELLIS.